United States Patent
Goering et al.

(10) Patent No.: US 10,139,022 B2
(45) Date of Patent: Nov. 27, 2018

(54) HEATABLE PIPE

(71) Applicants: Ranier Goering, Borken (DE); Jasmin Berger, Dortmund (DE); Michael Boeer, Olfen (DE)

(72) Inventors: Ranier Goering, Borken (DE); Jasmin Berger, Dortmund (DE); Michael Boeer, Olfen (DE)

(73) Assignee: Evonik Degussa GmbH, Essen (DE)

( * ) Notice: Subject to any disclaimer, the term of this patent is extended or adjusted under 35 U.S.C. 154(b) by 435 days.

(21) Appl. No.: 15/076,028

(22) Filed: Mar. 21, 2016

(65) Prior Publication Data

US 2016/0273684 A1     Sep. 22, 2016

(30) Foreign Application Priority Data

Mar. 20, 2015  (EP) .................................... 15160082

(51) Int. Cl.
| | | |
|---|---|---|
| *F16L 11/127* | (2006.01) | |
| *B32B 27/08* | (2006.01) | |
| *B32B 27/32* | (2006.01) | |
| *B32B 27/34* | (2006.01) | |
| *B32B 1/08* | (2006.01) | |
| *C08L 77/06* | (2006.01) | |
| *B01D 53/94* | (2006.01) | |
| *B23P 19/00* | (2006.01) | |
| *C08G 69/26* | (2006.01) | |
| *C08K 3/04* | (2006.01) | |
| *C08K 5/098* | (2006.01) | |
| *C08L 51/04* | (2006.01) | |
| *C08L 77/02* | (2006.01) | |
| *F16L 53/38* | (2018.01) | |
| *F16L 9/12* | (2006.01) | |
| *F24H 1/10* | (2006.01) | |
| *F24D 19/00* | (2006.01) | |

(52) U.S. Cl.
CPC ........ *F16L 11/127* (2013.01); *B01D 53/9431* (2013.01); *B23P 19/00* (2013.01); *B32B 1/08* (2013.01); *B32B 27/08* (2013.01); *B32B 27/32* (2013.01); *B32B 27/34* (2013.01); *C08G 69/265* (2013.01); *C08K 3/04* (2013.01); *C08K 5/098* (2013.01); *C08L 51/04* (2013.01); *C08L 77/02* (2013.01); *C08L 77/06* (2013.01); *B32B 2262/106* (2013.01); *B32B 2264/108* (2013.01); *B32B 2270/00* (2013.01); *B32B 2307/202* (2013.01); *B32B 2307/206* (2013.01); *B32B 2307/306* (2013.01); *B32B 2307/558* (2013.01); *F16L 9/12* (2013.01); *F16L 53/38* (2018.01); *F24D 19/0095* (2013.01); *F24H 1/105* (2013.01); *H05B 2203/017* (2013.01); *H05B 2214/03* (2013.01)

(58) Field of Classification Search
CPC ....... F16L 11/127; F16L 53/38; F16L 53/008; F16L 9/12; B32B 27/08; B32B 27/32; B32B 27/34; B32B 1/08; B32B 2262/106; B32B 2264/108; B32B 2270/00; B32B 2307/202; B32B 2307/206; B32B 2307/306; B32B 2307/558; C08L 77/06; B01D 53/9431; B23P 19/00; C08G 69/265; H05B 2203/017; H05B 2214/03; F24H 1/105; F24D 19/0095
See application file for complete search history.

(56) References Cited

U.S. PATENT DOCUMENTS

| | | |
|---|---|---|
| 2008/0274355 A1 | 11/2008 | Hewel |
| 2009/0148641 A1 | 6/2009 | Uchida et al. |
| 2013/0299030 A1 | 11/2013 | Goering et al. |
| 2014/0299220 A1 | 10/2014 | Montanari et al. |

FOREIGN PATENT DOCUMENTS

| | | |
|---|---|---|
| DE | 39 00 821 C1 | 4/1990 |
| EP | 0 306 638 A1 | 3/1989 |
| EP | 0 312 204 A2 | 4/1989 |
| EP | 0 312 204 A3 | 4/1989 |
| EP | 1 864 796 A1 | 12/2007 |
| EP | 1 988 113 A1 | 11/2008 |
| EP | 2 664 835 A1 | 11/2013 |
| EP | 2 857 456 A1 | 4/2015 |
| WO | WO 2006/090182 A1 | 8/2006 |
| WO | WO 2006/097765 A1 | 9/2006 |
| WO | WO 2009/052849 A1 | 4/2009 |
| WO | WO 2012/135393 A2 | 10/2012 |

OTHER PUBLICATIONS

European Search Report dated Dec. 4, 2015 in Patent Application No. 15160082.2 (with English Translation of categories of cited documents).

*Primary Examiner* — Michael C Miggins
(74) *Attorney, Agent, or Firm* — Oblon, McClelland, Maier & Neustadt, L.L.P.

(57) ABSTRACT

A heatable pipe contains a layer (layer I) of a moulding compound containing at least 40 wt. % of the following components: 1) 60 to 99 parts by wt. of a copolyamide based on hexamethylenediamine, terephthalic acid and an aliphatic dicarboxylic acid having 8 to 19 carbon atoms, and 2) 40 to 1 parts by wt. of an olefinic copolymer as impact modifier, wherein the parts by wt. of 1) and 2) sum to 100; and a conductor for electrical current which is embedded between an electrically insulating outer layer and an electrically insulating inner layer. The heatable pipe exhibits a high heat distortion temperature, very good impact resistance and a high elongation at break and is used for producing an SCR conduit, a conduit for diesel fuel or a conduit for a fuel cell system.

16 Claims, No Drawings

HEATABLE PIPE

BACKGROUND OF THE INVENTION

Field of the Invention

The present invention relates to a heatable pipe where at least one electrical conductor is embedded between an outer layer and an inner layer.

Discussion of the Background

When transporting liquid or gaseous media through a pipe it is often necessary to keep the temperature of the medium above a particular minimum temperature. Such pipes are typically constructed from plastics materials; they need to be able to be heated in a manner suited both to the medium and to the pipe material. Examples thereof are conduits for diesel fuel, where flocculation of paraffin constituents at winter temperatures needs to be prevented, conduits for fuel cell systems and also SCR conduits. Such conduits are usually made of a moulding compound based on an aliphatic polyamide, for example PA11 or PA12.

Diesel vehicles have a catalyst which denoxes the exhaust gases with the aid of an aqueous urea solution by selective catalytic reduction (SCR) to reduce the nitrogen oxide emissions. However, the employed aqueous urea solution, referred to across the industry as AdBlue®, freezes at temperatures of −11° C. and below. At these temperatures the transport of the urea solution from the reservoir container to the catalyst is thus no longer ensured and, consequently, denoxing of the exhaust gas is no longer possible. In order to prevent freezing of the AdBlue® even at low temperatures, the conduits need to be heatable and need to ensure defrosting of the AdBlue® within a period of about 10 minutes.

There are various options for warming such conduits. Current practice often comprises winding normal resistance heating means around the fluid pipe (WO 2009/052849). Another option for heating such a conduit is described in WO 2006/097765, WO 2006/090182, DE 39 00 821 C1 and in EP 0 306 638 A1. What is concerned in each of these documents is a multilayer pipe comprising two conductors which extend longitudinally along the pipe and are embedded in a conductive polymer layer such that they are offset from one another by 180°. The flow of current from one conductor to the other brings about the warming in the conductive layer. This arrangement has technical and economic advantages over the simple resistance heating means. However, this requires direct embedding of the conductor into the plastics material and thus electrical contact between the matrix and the conductor.

Helical winding of the electrodes offers improved conduit flexibility, EP 0 312 204 A2 discloses a heatable conduit where two electrodes are helically wound around the pipe and embedded in an electrically conductive layer. EP2 664 835 A1 discloses a similar heatable conduit pipe having an improved construction.

In automobiles, conduits for diesel fuel and also SCR conduits are increasingly routed in areas where they are exposed to high temperatures, for instance in engine bays or in proximity to the exhaust system. This can result in temperature peaks which lead to deformation of the conduit or to failure. Continuous exposure to high temperatures may moreover result in ageing of the conduit material of construction. These conduits must therefore comprise at least one layer of a material of construction having a high heat distortion temperature and good thermal ageing resistance. A material of construction having a crystallite melting point $T_m$ of at least 220° C. and also sufficient crystallinity would be desirable.

Furthermore, the inner layer material of PA11 or PA12 that is employed in the related art has only limited hydrolysis resistance when exposed to such heat.

Efforts have therefore been ongoing for some time now to replace aliphatic polyamides with partly aromatic polyamides in automobile construction. For instance, WO 2005/018891 describes hollow articles comprising at least one layer of an impact-modified partly aromatic polyamide; said articles may further comprise layers of an aliphatic polyamide but no further layers.

However, the commercially available partly aromatic polyamides are unsuitable for such applications because of their poor mechanical properties, in particular their poor impact resistance and low elongation at break. EP 2857456 A1 discloses measurements on moulding compounds made of a PA6T/6I/66 and a PA10T/TMDT, each comprising 30 wt. % of different impact modifiers; the elongation at break is 3% to 6%. US 2014/0299220 A1 sheds further light; comparative example 22 therein shows a pipe comprising an 800 μm-thick layer of an impact-modified PA6T/6I/66 and a 200 μm-thick layer of an ETFE, the elongation at break of the pipe being 13%. Comparative example 24 shows a corresponding pipe where the polyamide layer is made of an impact-modified PA9T whose diamine fraction is a 50:50 isomer mixture of 1,9-nonanediamine and 2-methyl-1,8-octanediamine; the elongation at break here is 22%. Finally, comparative example 27 shows a corresponding pipe where the polyamide layer is made of an impact-modified further PA6T/6I/66; the elongation at break here is 18%. However, it is desirable to achieve a higher elongation at break of the pipe, in some applications of more than 100%, coupled with a high impact resistance in order to prevent mechanical damage during routing, during repairs, during accidents or as a result of stone impacts.

EP 1988113 A1 describes a polyamide moulding compound based on a copolyamide 10T/6T which is formed from the monomers 1,10-decanediamine, 1,6-hexamethylenediamine and terephthalic acid. The copolyamides have relatively high melting points in the region of 300° C.; the processing window is thus comparatively small. In-house experiments have revealed that impact-modified moulding compounds of this type have a low elongation at break.

SUMMARY OF THE INVENTION

It is an object of the present invention to provide a heatable pipe exhibiting a high heat distortion temperature, improved hydrolysis resistance and also high impact resistance and a high elongation at break.

The present invention relates to a heatable pipe, comprising:
a layer (layer I) of a moulding compound comprising at least 40 wt. % of the following components:
1) 60 to 99 parts by wt. of a partly aromatic copolyamide containing monomer units obtained from
α) 30 to 90 mol % of a combination of hexamethylenediamine and terephthalic acid, and
β) 70 to 10 mol % of a combination of hexamethylenediamine and a linear aliphatic dicarboxylic acid having 8 to 19 carbon atoms;
wherein the mol % values relate to the sum of α) and β) and
wherein not more than 20% of the hexamethylenediamine is optionally replaced by the equivalent amount of another diamine and/or wherein not more than 20% of the terephthalic acid is optionally replaced by the equivalent amount of another aromatic dicarboxylic acid and/or 1,4-cyclohexanedicarboxylic acid and/or wherein not more than 20% of the repeating units containing hexamethylenediamine and linear aliphatic dicarboxylic acid are optionally replaced by the equivalent amount of units obtained from a lactam/an ω-aminocarboxylic acid having 6 to 12 carbon atoms, 2) 40 to 1 parts by wt. of an olefinic copolymer as impact modifier, wherein the parts by wt. of 1) and 2) sum to 100; and a conductor for electrical current which is embedded between an electrically insulating outer layer and an electrically insulating inner layer.

In another embodiment, the present invention relates to an SCR conduit, a conduit for diesel fuel or a conduit for a fuel cell system, comprising:

the above heatable pipe.

The present invention also relates to a method of producing an SCR conduit, a conduit for diesel fuel or a conduit for fuel cell systems, said method comprising:

attaching a connecting element, a connector, a clip, a holder, a cable, a plug or a sealing ring to the above heatable pipe.

In yet another embodiment, the present invention provides a method of producing an SCR conduit, a conduit for diesel fuel or a conduit for fuel cell systems, said method comprising:

thermoforming of the above heatable pipe to impart a flexuous shape.

DETAILED DESCRIPTION OF THE INVENTION

The ranges below include all values and subvalues between the lower and higher limit of the range.

In the course of the associated research, a moulding compound based on a partly aromatic polyamide was found which fulfils the above mentioned criteria. The present invention accordingly provides a heatable pipe comprising a layer (layer I) comprising at least 40 wt. %, preferably at least 50 wt. %, particularly preferably at least 60 wt. %, especially preferably at least 70 wt. % and very particularly preferably at least 80 wt. % of a mixture of the following components:

1) 60 to 99 parts by wt., preferably 65 to 98 parts by wt., particularly preferably 68 to 97 parts by wt. and especially preferably 70 to 96 parts by wt. of a partly aromatic copolyamide composed of monomer units derived from α) 30 to 90 mol %, preferably 35 to 85 mol %, particularly preferably 40 to 80 mol %, especially preferably 41 to 75 mol % and very particularly preferably 45 to 70 mol % of a combination of hexamethylenediamine and terephthalic acid and β) 70 to 10 mol %, preferably 65 to 15 mol %, particularly preferably 60 to 20 mol %, especially preferably 59 to 25 mol % and very particularly preferably 55 to 30 mol % of a combination of hexamethylenediamine and a linear aliphatic dicarboxylic acid having 8 to 19 carbon atoms, wherein the mol % values relate to the sum of α) and β) and wherein not more than 20%, preferably not more than 15%, particularly preferably not more than 12%, especially preferably not more than 8% and very particularly preferably not more than 5% or not more than 4% of the hexamethylenediamine may be replaced by the equivalent amount of another diamine and/or wherein not more than 20%, preferably not more than 15%, particularly preferably not more than 12%, especially preferably not more than 8% and very particularly preferably not more than 5% or not more than 4% of the terephthalic acid may be replaced by the equivalent amount of another aromatic dicarboxylic acid and/or 1,4-cyclohexanedicarboxylic acid and/or wherein not more than 20%, preferably not more than 15%, particularly preferably not more than 12%, especially preferably not more than 8% and very particularly preferably not more than 5% or not more than 4% of the repeating units composed of hexamethylenediamine and linear aliphatic dicarboxylic acid may be replaced by the equivalent amount of units derived from a lactam/an ω-aminocarboxylic acid having 6 to 12 carbon atoms, 2) 40 to 1 parts by wt., preferably 35 to 2 parts by wt., particularly preferably 32 to 3 parts by wt. and especially preferably 30 to 4 parts by wt. of an olefinic copolymer, as impact modifier, wherein the parts by wt. of 1) and 2) sum to 100; and a conductor for electrical current which is embedded between an electrically insulating outer layer and an electrically insulating inner layer.

The term "electrically insulating" is to be understood here and in what follows as meaning that the particular moulding compound comprises essentially no conductive additives. The specific resistance of this moulding compound is generally greater than $10^{10}$ Ωm determined according to DIN IEC 60093.

The invention may be realized in various embodiments.

In a first embodiment the layer I is the inner layer. The conductor for electrical current is a metallic conductor installed directly between the inner layer and the outer layer either longitudinally along the pipe or, preferably, wound around the inner layer. The metallic conductor is, for example, a wire, a stranded wire or a band. Said conductor may be made of any sufficiently conductive and sufficiently durable metal, for example of copper, silver or aluminum. The metallic conductor is further surrounded by insulation.

The metallic conductor preferably has a thickness in the range from 0.1 to 2 mm, particularly preferably in the range from 0.2 to 1 mm and especially preferably in the range from 0.3 to 0.8 mm. For electrical conductors which do not have a circular cross-section, for instance in the case of flat stranded wires or bands, this is to be understood as meaning the smallest thickness.

Suitable adhesion promoters or adhesives may be utilized to secure the metallic conductor to the pipe. Mechanical securing using threads, bands or a shrink film is also possible.

To provide thermal insulation and to provide protection against mechanical damage the pipe is sheathed with a protective cover as an outer layer which is subsequently mechanically applied. Said cover may be, for example, a corrugated pipe or a smooth pipe which is shrunk on. This protective cover may be made of any suitable material.

The production of such a heatable pipe advantageously comprises initially producing a pipe by extrusion to form the inner layer, applying the metallic conductor and then pulling the outer layer over said inner layer and conductor.

This embodiment primarily utilizes the good hydrolysis resistance of the moulding compound of layer I.

In one variant thereof the protective cover is also made of the moulding compound of layer I. This embodiment additionally utilizes the relatively high heat distortion temperature, the improved thermal ageing resistance and the high mechanical stability.

In a second embodiment the inner layer is made of a suitable related art moulding compound, for example of a moulding compound as described herein below for the inner layer of the fifth embodiment. To provide thermal insulation and to provide protection against mechanical damage the pipe is sheathed with a protective cover as an outer layer which is subsequently mechanically applied and here constitutes the layer I, i.e. is made of the claimed moulding compound. Said cover may be, for example, a corrugated pipe or a smooth pipe which is shrunk on. This embodiment exclusively utilizes the relatively high heat distortion temperature, the improved thermal ageing resistance and the high mechanical stability.

In a third embodiment the inner layer is as per the first embodiment. The conductor for electrical current is a metallic conductor installed directly between the inner layer and the outer layer either longitudinally along the pipe or, preferably, wound around the inner layer. The metallic conductor is, for example, a wire, a stranded wire or a band. Said conductor may be made of any sufficiently conductive and sufficiently durable metal, for example of copper, silver or aluminum. Said conductor may have a media-resistant coating, preferably of tin or nickel. The metallic conductor may be surrounded by insulation although this is typically not the case.

The metallic conductor preferably has a thickness in the range from 0.1 to 2 mm, particularly preferably in the range from 0.2 to 1 mm and especially preferably in the range from 0.3 to 0.8 min. For electrical conductors which do not have a circular cross-section, for instance in the case of flat stranded wires or bands, this is to be understood as meaning the smallest thickness.

The outer layer may be made of any suitable material. Said layer is applied by extrusion, for example via a crosshead die. This embodiment primarily utilizes the good hydrolysis resistance of the moulding compound of layer I.

In one variant thereof the outer layer is also made of the moulding compound of layer I. This embodiment additionally utilizes the relatively high heat distortion temperature, the improved thermal ageing resistance and the high mechanical stability.

In a fourth embodiment the inner layer is as per the second embodiment. The conductor for electrical current is as per the third embodiment. The outer layer is made of the moulding compound of layer I. Said layer is applied by extrusion, for example via a crosshead die. This embodiment exclusively utilizes the relatively high heat distortion temperature, the improved thermal ageing resistance and the high mechanical stability.

In a fifth embodiment the conductor for electrical current is a middle layer of an electrically conductive thermoplastic moulding compound in which at least one pair of electrical conductors which are spaced apart from one another is embedded. When in operation the two electrical conductors have opposite polarities; this brings about a flow of current through the electrically conductive moulding compound of the middle layer, the ohmic resistance thereof causing the flow of current to be converted into heat. The middle layer is embedded between the inner layer and the outer layer.

This fifth embodiment is more particularly described herein below. All disclosures relating to the moulding compound of the layer I, to the inner layer and to the outer layer are equally applicable to the first, the second, the third and the fourth embodiment.

In the partly aromatic polyamide of the moulding compound of the layer I, suitable linear aliphatic dicarboxylic acids having 8 to 19 carbon atoms include the following: octanedioic acid (suberic acid; $C_8$), nonanedioic acid (azelaic acid; $C_9$), decanedioic acid (sebacic acid; $C_{10}$), undecanedioic acid ($C_{11}$), dodecanedioic acid ($C_{12}$), tridecanedioic acid ($C_{13}$), tetradecanedioic acid ($C_{14}$), pentadecanedioic acid ($C_{15}$), hexadecanedioic acid ($C_{16}$), heptadecanedioic acid ($C_{17}$), octadecanedioic acid ($C_{18}$) and nonadecanedioic acid ($C_{19}$).

In accordance with the claims a portion of the hexamethylenediamine may optionally be replaced by another diamine. Any diamine is suitable here in principle and the following diamines may be cited by way of example: 1,10-decanediamine, 1,12-dodecanediamine, m-xylylenediamine, p-xylylenediamine, bis(4-aminocyclohexyl)methane, 2-methyl-1,5-pentanediamine and 1,4-bis-aminomethylcyclohexane. It will be appreciated that it is also possible to employ mixtures of such diamines. However, it is preferable when no further diamine is employed in addition to hexamethylenediamine.

In accordance with the claims a portion of the terephthalic acid may also optionally be replaced by another aromatic dicarboxylic acid or by 1,4-cyclohexanedicarboxylic acid. Any aromatic dicarboxylic acid is suitable here in principle and the following dicarboxylic acids may be cited by way of example; isophthalic acid, 4,4'-diphenyldicarboxylic acid, 4,4'-diphenyl ether dicarboxylic acid, 2,6-naphthalenedicarboxylic acid, 1,4-naphthalenedicarboxylic acid and 1,5-naphthalenedicarboxylic acid. It will be appreciated that it is also possible to employ mixtures of such dicarboxylic acids. However, it is preferable when no further aromatic dicarboxylic acid and/or no 1,4-cyclohexanedicarboxylic acid is employed in addition to terephthalic acid. Similarly, in accordance with the claims a portion of the repeating units composed of hexamethylenediamine and linear aliphatic dicarboxylic acid may optionally be replaced by a lactam/an ω-aminocarboxylic acid having 6 to 12 carbon atoms. Here, the repeating unit composed of hexamethylenediamine and linear aliphatic dicarboxylic acid corresponds to a unit derived from a lactam/an ω-aminocarboxylic acid. Examples of lactams/ω-aminocarboxylic acids having 6 to 12 carbon atoms include caprolactam, capryl lactam, undecanolactam, ω-aminoundecanoic acid, lauryl lactam and ω-aminododecanoic acid. Preference is given here to lactams/ω-aminocarboxylic acids having 11 or 12 carbon atoms. However, it is preferable when no lactam/no ω-aminocarboxylic acid is employed in addition to hexamethylenediamine and linear aliphatic dicarboxylic acid.

The composition of the partly aromatic copolyamide is advantageously selected such that its crystallite melting point $T_m$ as per ISO 11357 and measured at 2nd heating is in the range from 220° C. to 300° C., preferably in the range from 230° C., to 295° C. and particularly preferably in the range from 240° C. to 290° C. When there are several melting peaks $T_m$ is determined from the main melting peak.

The copolyamide is generally produced by melt polycondensation. Appropriate methods are related art. It is alternatively possible to employ any other known method of polyamide synthesis.

A necessarily equimolar combination of hexamethylenediamine and terephthalic acid is provided when it is ensured that these monomers can react in a molar ratio of 1:1. It may be noted that hexamethylenediamine is relatively volatile and that losses may therefore occur during the polycondensation which need to be compensated with a larger charge. It may moreover be necessary to deviate slightly from the exact stoichiometry to establish a particular end group ratio. The same applies to 1)β) for the necessarily equimolar combination of hexamethylenediamine and a linear aliphatic dicarboxylic acid having 8 to 19 carbon atoms.

In a preferred embodiment the partly aromatic polyamide has a ratio of amino end groups to the sum of amino and carboxyl end groups of 0.3 to 0.7 and particularly preferably 0.35 to 0.65. The fraction of amino end groups may be adjusted by controlling the polycondensation using methods known to those skilled in the art. Control may be affected, for example, by varying the ratio of diamine employed to dicarboxylic acid employed, by addition of a monocarboxylic acid or by addition of a monoamine. The fraction of amino end groups may also be adjusted by mixing two copolyamides, of which one is rich in amino end groups and the other is low in amino end groups, as pellets or in the melt.

The amino group content my be determined by titration of a solution of the copolyamide m-cresol using perchloric acid. The determination of the carboxyl group content may be effected by titration of a solution of the copolyamide o-cresol using KOH in ethanol. These methods are familiar to those skilled in the art.

The impact modifier is in particular an olefinic copolymer comprising units of the following monomers:
  a) 20 to 99.9 wt. % and preferably 30 to 99.7 wt. % of one or more α-olefins having 2 to 12 carbon atoms,
  b) 0 to 50 wt. % of one or more acrylic compounds selected from
     acrylic acid, methacrylic acid and salts thereof and esters of acrylic acid/methacrylic acid with a $C_1$ to $C_{12}$ alcohol, with the exception of epoxy group-containing esters such as glycidyl acrylate and glycidyl methacrylate,
  c) 0.1 to 50 wt. % of an olefinically unsaturated epoxide or dicarboxylic anhydride,
wherein the wt. % values relate to the olefinic copolymer and sum to not more than 100. It should be noted that units derived from further comonomers, for example from styrene or an unconjugated diene, may additionally be present.

When the component c) is composed of units derived from an unsaturated dicarboxylic anhydride, said units are preferably present in amounts of 0.1 to 8 wt. %, particularly preferably 0.3 to 5 wt. %.

When the component c) is composed of units derived from an olefinically unsaturated epoxide, the acrylic compound according to b) comprises neither acrylic acid nor methacrylic acid.

In a first variant the impact modifier is an olefinic copolymer comprising the following monomer units:
  35 to 94.9 wt. %, preferably 40 to 90 wt. % and particularly preferably 45 to 85 wt. % of monomer units based on ethene,
  5 to 65 wt. %, preferably 10 to 60 wt. % and particularly preferably 15 to 55 wt. % of monomer units based on a 1-alkene having 4 to 8 carbon atoms,
  0 to 10 wt. % of monomer units based on another olefin and
  0.1 to 2.5 wt. % of monomer units based on an aliphatically unsaturated dicarboxylic anhydride,
  wherein the individual fractions are chosen such that these wt. % values sum to 100. Further inventive lower limits for the monomer units based on ethene are 34.9 wt. %, preferably 39.9 wt. % and particularly preferably 44.9 wt. %, while further inventive upper limits therefor are preferably 89.9 wt. % and particularly preferably 84.9 wt. %.

Suitable for employment in the olefinic copolymer as the 1-alkene having 4 to 8 carbon atoms are the following compounds: 1-butene, 1-pentene, 1-hexene, 1-heptene and 1-octene. It will be appreciated that the monomer units based on a 1-alkene having 4 to 8 carbon atoms may also be derived from mixtures of these compounds.

There is no restriction on the nature of the other olefin whose monomer units can make up from 0 to 10 wt. % of the olefinic copolymer. For example said olefin may be an unconjugated diene, a mono-ene such as propene, 4-methyl-1-pentene or styrene or a mixture thereof.

In a first modification the other olefin whose monomer units can make up from 0 to 10 wt. % of the olefinic copolymer is not an unconjugated diene.

In a second modification this other olefin is not styrene and/or not propene.

In a third modification the olefinic copolymer comprises only monomer units derived from ethene, a 1-alkene having 4 to 8 carbon atoms and an aliphatically unsaturated dicarboxylic anhydride.

In a fourth modification the 1-alkene having 4 to 8 carbon atoms is 1-butene.

In a fifth modification the 1-alkene having 4 to 8 carbon atoms is 1-hexene.

In a sixth modification the 1-alkene having 4 to 8 carbon atoms is 1-octene.

These modifications may be combined with one another without restriction.

The aliphatically unsaturated dicarboxylic anhydride may be, for example, maleic anhydride but other corresponding compounds such as aconitic anhydride, citraconic anhydride or itaconic anhydride for instance are also suitable.

The olefinic copolymer according to the claims may be produced in known fashion, wherein the aliphatically unsaturated dicarboxylic anhydride or a precursor thereof, for example the corresponding acid or a half ester, is reacted with a preformed copolymer by thermal or preferably by free-radical reaction. Here the aliphatically unsaturated dicarboxylic anhydride may also be reacted in combination with other monomers, for example with dibutyl fumarate or styrene. Olefinic copolymers according to the claims are commercially available in various types.

In a second variant the impact modifier is an olefinic copolymer comprising the following monomer units:
  35 to 94.9 wt. %, preferably 40 to 90 wt. % and particularly preferably 45 to 85 wt. % of monomer units based on ethene,
  5 to 65 wt. %, preferably 10 to 60 wt. % and particularly preferably 15 to 55 wt. % of monomer units based on propene,
  0 to 10 wt. % of monomer units based on another olefin, for example an unconjugated diene, and
  0.1 to 2.5 wt. % of monomer units based on an aliphatically unsaturated dicarboxylic anhydride,
  wherein the individual fractions are chosen such that these wt. % values sum to 100. Further inventive lower limits for the monomer units based on ethene are 34.9 wt. %, preferably 39.9 wt. % and particularly preferably 44.9 wt. %, while further inventive upper limits therefor are preferably 89.9 wt. % and particularly preferably 84.9 wt. %.

In a third variant the impact modifier is a hydrogenated and anhydride-modified block copolymer comprising at least one polyvinylaromatic block A and at least one polyolefin block B. The blocks may be arranged in linear or star-shaped fashion, for example as structures of the type A-B, A-B-A, B-A-B, A-B-A-B, A-B-A-B-A, B-A-B-A-B, $(A)B_3$, $(B)A_3$, $(A)(B-A)_3$, $(B)(A-B)_3$ etc., wherein the number-average molecular weight of these block copolymers is in the range from about 10 000 to about 800 000 and preferably in the range from about 20 000 to about 500 000. The fraction of vinylaromatic compound in the block copolymer is preferably 10 to 70 wt. % and particularly preferably 10 to 55 wt. %. The rubber-like polyolefin blocks B comprise, for example, ethylene/propylene, ethylenebutylene or ethylene/pentylene units; they are obtained by polymerization of conjugated dienes and, in particular, of butadiene, isoprene, 1,3-pentadiene, 2,3-dimethylbutadiene or mixtures thereof and by subsequent selective hydrogenation. This hydrogenates at least 80% of the aliphatic double bonds in the polymerized diene fraction, preferably at least 90% and particularly preferably at least 94%. The vinylaromatic compound used to produce the polyvinylaromatic block is typically styrene but it is also possible to employ, for example, α-methylstyrene or the like. The hydrogenated block copolymer comprises 0.1 to 8 wt. % and preferably 0.3 to 5 wt. % of succinic anhydride groups which are introduced by reaction with an unsaturated dicarboxylic acid or anhydride thereof such as maleic anhydride, citraconic acid, itaconic acid or the like either before or preferably after the hydrogenation. The production of such anhydride-modified, hydrogenated vinylaromatic/conjugated diene block copolymers is related art; suitable types are commercially available, for example under the trade name Kraton® FG1901X. This is a linear triblock copolymer of the SEBS type (styrene-ethylene/butylene-styrene) having a polystyrene content of 30 wt. % and a fraction of succinic anhydride groups of 1.4 to 2 wt. %.

In a fourth variant the impact modifier is a mixture of
5 to 95 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100, and
95 to 5 wt. % of an olefinic copolymer comprising units of the following monomers:
42 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 8 wt. % of an olefinically unsaturated dicarboxylic anhydride,
wherein the wt. % values relate to the olefinic copolymer and sum to not more than 100.

The α-olefin having 2 to 12 carbon atoms is, for example, selected from ethene, propene, 1-butene, 1-pentene, 4-methylpent-1-ene, 1-hexene, 1-heptene, 1-octene, 1-nonene, 1-decene, 1-undecene and 1-dodecene, preference being given to ethene.

Examples of esters of acrylic acid or methacrylic acid include, in particular, methyl acrylate, ethyl acrylate, n-butyl acrylate, isobutyl acrylate, 2-ethylhexyl acrylate, methyl methacrylate, ethyl methacrylate, n-butyl methacrylate and 2-ethylhexyl methacrylate.

Examples of olefinically unsaturated epoxides include, in particular, glycidyl esters and glycidyl ethers, such as glycidyl acrylate, glycidyl methacrylate, glycidyl maleate, glycidyl itaconate, vinylglycidyl ether and allylglycidyl ether.

Examples of olefinically unsaturated dicarboxylic anhydrides include maleic anhydride, itaconic anhydride, citraconic anhydride, 2,3-dimethylmaleic anhydride and bicyclo [2.2.2]oct-5-ene-2,3-dicarboxylic anhydride.

In a fifth variant the impact modifier is a mixture of
70 to 99 wt. % of the impact modifier from the first variant and
1 to 30 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100.

The details of the olefinic copolymer employed here are the same as described for the fourth variant.

In a sixth variant the impact modifier is a mixture of
70 to 99 wt. % of the impact modifier from the second variant and
1 to 30 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100.

The details of the copolymer employed here are the same as described for the fourth variant.

In a seventh variant the impact modifier is a mixture of
50 to 99 wt. % of the impact modifier from the first variant and
1 to 50 wt. % of the hydrogenated and anhydride-modified block copolymer from the third variant.

In an eighth variant the impact modifier is a mixture of
50 to 99 wt. % of the impact modifier from the second variant and
1 to 50 wt. % of the hydrogenated and anhydride-modified block copolymer from the third variant.

These variants are merely exemplary. It is also possible in the context of the invention to employ other impact modifiers not cited here. The first variant is particularly preferred here since such moulding compounds have a particularly high thermal ageing resistance. Also preferable are the fifth variant and the seventh variant which likewise comprise the impact modifier from the first variant.

In addition to the components 1) and 2) the moulding compound of layer I optionally contains further additions which make up the balance to 100 wt. %, and preferably at least 0.01 wt. % thereof. Examples of these further additions include:
a) stabilizers,
b) other polymers,
c) plasticizers,
d) pigments and/or dyes and
e) processing aids.

In a preferred embodiment, the moulding compound contains an active amount of a copper-containing stabilizer. This is in particular a copper compound soluble in the polyamide matrix. The copper compound is preferably combined with an alkali metal halide.

In certain embodiments, the stabilizer is a copper(I) salt, e.g. copper acetate, copper stearate, an organic copper complex, for example copper acetylacetonate, a copper halide or the like in combination with an alkali metal halide.

In certain embodiments, the copper-containing stabilizer comprises a copper halide selected from copper iodide and copper bromide and an alkali metal halide selected from the iodides and bromides of lithium, sodium and potassium.

It is preferable to employ the copper-containing stabilizer in an amount such that the moulding compound contains 20 to 2000 ppm of copper, particularly preferably 30 to 1500 ppm of copper and especially preferably 40 to 1000 ppm of copper.

It is further preferable when the copper-containing stabilizer has a composition such that the weight ratio of alkali metal halide to copper compound is in the range from 2.5 to 12 and particularly preferably in the range from 6 to 10. The combination of alkali metal halide and copper compound is generally present in the moulding compound in an amount of from about 0.01 wt. % to about 2.5 wt. %.

The copper-containing stabilizer offers protection against long-term thermal ageing, for example in under-bonnet automobile applications.

In a further preferred embodiment, the moulding compound comprises an active amount of an oxidation stabilizer and particularly preferably an active amount of an oxidation stabilizer in combination with the active amount of a copper-containing stabilizer. Examples of suitable oxidation stabilizers include aromatic amines, sterically hindered phenols, phosphites, phosphonites, thio synergists, hydroxylamines, benzofuranone derivatives, acryloyl-modified phenols etc. A great many types of such oxidation stabilizers are commercially available, for example under the trade names Naugard 445, Irganox 1010, Irganox 1098, Irgafos 168, P-EPQ or Lowinox DSTDP. The moulding compound generally comprises about 0.01 to about 2 wt. % and preferably about 0.1 to about 1.5 wt. % of an oxidation stabilizer.

The moulding compound may moreover further comprise a UV stabilizer/a light stabilizer of the HALS type. Suitable UV stabilizers are primarily organic UV absorbers, for example benzophenone derivatives, benzotriazole derivatives, oxalanilides or phenyltriazines. Light stabilizers of the HALS type are tetramethylpiperidine derivatives; these are inhibitors which act as radical scavengers. UV stabilizers and light stabilizers may advantageously be used in combination. A great many types of both are commercially available; the manufacturer's instructions can be followed in respect of the amounts employed.

The moulding compound may additionally comprise a hydrolysis stabilizer, for instance a monomeric, oligomeric or polymeric carbodiimide or a bisoxazoline.

Examples of other polymers which may be present in the moulding compound as an addition include aliphatic polyamides, polyether amides, or polytetrafluoroethylene (PTFE).

Examples of suitable aliphatic polyamides include PA416, PA66, PA68, PA610, PA612, PA613, PA410, PA412, PA810, PA1010, PA1012, PA1013, PA1014, PA1018, PA1212, PA6, PA11 and PA12 and also copolyamides derived from these types. It is preferable when the polyamide fraction of the moulding compound composed of the partly aromatic copolyamide, optionally aliphatic polyamide and optionally polyether amide comprises less than 10 wt. %, particularly preferably less than 8 wt. %, especially preferably less than 5 wt. % and very particularly preferably less than 3 wt. % of aliphatic polyamide or preferably less than 10 wt. %, particularly preferably less than 8 wt. %, especially preferably less than 5 wt. % and very particularly preferably less than 3 wt. % of the sum of aliphatic polyamide and polyether amide.

Plasticizers and the use thereof in polyamides are known. A general overview of plasticizers suitable for polyamides may be found in Gächter/Müller, Kunststoffadditive [Plastics additives], C. Hanser Verlag, 2nd edition, p 296.

Examples of conventional compounds suitable for employment as plasticizers include esters of p-hydroxybenzoic acid having 2 to 20 carbon atoms in the alcohol component or amides of arylsulphonic acids having from 2 to 12 carbon atoms in the amine component, preferably amides of benzenesulphonic acid.

Suitable plasticizers include, inter alia, ethyl p-hydroxybenzoate, octyl p-hydroxybenzoate, i-hexadecyl, p-hydroxybenzoate, toluenesulphonic acid n-octylamide, benzenesulphonic acid n-butylamide or benzenesulphonic acid 2-ethylhexylamide.

Examples of suitable pigments and/or dyes include carbon black, iron oxide, zinc sulphide, ultramarine, nigrosin and pearlescent pigments. Carbon black does not have a noticeable effect on insulating action in the concentrations used for coloring.

Examples of suitable processing aids include paraffins, fatty alcohols, fatty acid amides, stearates such as calcium stearate, paraffin waxes, montanates or polysiloxanes.

The moulding compound is produced from the individual constituents in a manner known to those skilled in the art by melt mixing.

The material of the electrically conductive middle layer is a thermoplastic moulding compound. The moulding compound may be constructed, for example, on the basis of polyamides, polyolefins, fluoropolymers, thermoplastic polyesters, polyurethane or mixtures thereof. The term "on the basis of" is to be understood here and elsewhere as meaning that the moulding compound comprises at least 40 wt. %, preferably at least 50 wt. % and particularly preferably at least 60 wt. % of the cited polymers. In principle it is possible to employ here any moulding compound in which the conductor pair may readily be embedded, which has adequate mechanical properties and a sufficiently high heat distortion temperature for the application and which exhibits sufficient adhesion to the adjacent layers optionally after modification or with the aid of an adhesion promoter layer.

In one preferred embodiment the electrically conductive thermoplastic moulding compound of the middle layer is a moulding compound based on an aliphatic polyamide. The aliphatic polyamide may be produced from a combination of diamine and dicarboxylic acid, from an ω-aminocarboxylic acid or from the corresponding lactam. It is possible in principle to employ any polyamide, for example PA6 or PA66. In one preferred embodiment, the monomer units of the polyamide comprise on average at least 8, at least 9, or at least 10 carbon atoms. For polyamides deriving from mixtures of lactams it is the arithmetic average that is considered here. For a combination of diamine and dicarboxylic acid the arithmetic average of the number of carbon atoms from diamine and dicarboxylic acid in this preferred embodiment must be at least 8, at least 9 or at least 10. Examples of suitable polyamides include: PA610 (producible from hexamethylenediamine [6 carbon atoms] and sebacic acid [10 carbon atoms], the average of the number of carbon atoms in the monomer units is thus 8 here), PA88 (producible from octamethylenediamine and 1,8-octanedioic acid), PA8 (producible from caprylolactam), PA612, PA810, PA108, PA9, PA613, PA614, PA812, PA128, PA1010, PA10, PA814, PA148, PA1012, PA11, PA1014, PA1212 and PA12. The production of the polyamides is related art. It will be appreciated that it is also possible to employ copolyamides based on these substances and that optional co-use of monomers such as caprolactam is also possible.

The polyamide may also be a polyetheresteramide or a polyetheramide. Polyetheramides are known in principle from DE-OS 30 06 961 for example. They comprise a polyetherdiamine as comonomer. Suitable polyetherdiamines are obtainable by conversion of the corresponding polyetherdiols by reductive amination or coupling to acrylonitrile with subsequent hydrogenation (e.g. EP A-0 434 244; EP-A-0 296 852). Said polyetherdiamines generally have a number-average molar mass of from 230 to 4000 and are generally present in the polyetheramide in a fraction of from 5 to 50 wt. %.

Commercially available polyether diamines derived from propylene glycol are commercially available from Huntsman as the JEFFAMINE® "D series". Also very suitable in principle are polyetherdiamines derived from 1,4-butanediol or 1,3-butanediol or polyetherdiamines of mixed structure for instance with random or with blockwise distribution of the units originating from the diols.

It is likewise possible to use mixtures of different polyamides provided that they are sufficiently compatible. Compatible polyamide combinations are known to those skilled in the art; examples include the combinations PA12/PA1012, PA12/PA1212, PA612/PA12, PA613/PA12, PA1014/PA12 and PA610/PA12, and also corresponding combinations with PA11. Where there is any doubt, compatible combinations may be determined by routine experimentation.

One preferred embodiment employs a mixture of 30 to 99 wt. %, particularly preferably 40 to 98 wt. % and especially preferably 50 to 96 wt. % of polyamide in the narrower sense and 1 to 70 wt. %, particularly preferably 2 to 60 wt. % and especially preferably 4 to 50 wt. % of polyetheresteramide and/or polyetheramide. Preference here is given to polyetheramides.

In addition to polyamide the moulding compound may comprise further components, for example impact modifiers, other thermoplasts, plasticizers and other customary added substances. All that is required is that the polyamide forms the matrix of the moulding compound.

In a further embodiment the electrically conductive thermoplastic moulding compound of the middle layer is a moulding compound based on a partly aromatic polyamide, examples including PA66/6T, PA6/6T, PA6T/MPNEDT (MPMD stands for 2-methylpentamethylenediamine), PA9T, PA10T, PA11T, PA12T, PA14T and also copolycondensates of these latter types with an aliphatic diamine and an aliphatic dicarboxylic acid or with an ω-aminocarboxylic acid/a lactam. Such moulding compounds exhibit a high heat distortion temperature but are generally difficult to process and have inadequate mechanical properties. However, it is preferable in such a case to employ a moulding compound which based on its composition falls within the scope of the moulding compound specified for layer I and further comprises only a conductivity additive.

The electrically conductive thermoplastic moulding compound of the middle layer may comprise further components, for example impact modifiers, other thermoplasts, plasticizers and other customary added substances. The electrical conductivity of this moulding compound is achieved in known fashion, for example by addition of conductive carbon black, graphite powder and/or graphite fibrils (carbon nanotubes). The specific resistance of this plastics material moulding compound is in the range from $10^{-3}$ to $10^{10}$ Ωm, preferably in the range from $10^{-2}$ to $10^{8}$ Ωm, particularly preferably in the range from $10^{-1}$ to $10^{7}$ Ωm and especially preferably in the range from $10^{0}$ to $10^{6}$ Ωm, wherein measurement is performed as per INN IEC 60093 in the range from $10^{4}$ Ωm and above and as per EN ISO 3915 in the range below $10^{4}$ Ωm.

To improve electrical conductivity/to reduce the percolation threshold the conductive plastics material moulding compound may further comprise a salt having a nonmetallic cation, a dispersant based on esters or amides or a mixture of these two. Suitable salts having a nonmetallic cation, dispersants based on esters or amides and usage amounts therefor are disclosed in US2013/0299750A1.

In many applications, for example in motor vehicle and commercial vehicle systems, the voltage available is not constant. The necessary heating power must nevertheless be ensured when the voltage is low. By contrast, when the voltage is high the maximum allowable temperature must not be exceeded. The electrically conductive moulding compound is thus preferably designed such that it exhibits a PTC (positive temperature coefficient) effect. This means that the resistance of the moulding compound increases with increasing temperature. This effect occurs particularly upon employment of conductive carbon black and/or graphite as the conductive additive. This effect is an intrinsic safety feature since it counteracts the occurrence of an excessive increase in conduit temperature as voltage increases. This is important so as not to exceed an ignition temperature, a flash point or a decomposition temperature of the medium to be transported or cause thermal damage to the conduit material itself.

The electrical conductors employed as electrodes are, for example, wires, stranded wires or bands. Said conductors may be made of any sufficiently conductive and sufficiently durable metal, for example of copper, silver or aluminum. Said conductors may have a media-resistant coating, preferably of tin or nickel. When in operation the electrodes have opposite polarities and the potential difference between the electrodes then results in a flow of current through the two electrically conductive layers, thus generating heat.

The electrical conductors preferably have a thickness in the range from 0.1 to 2 mm, particularly preferably in the range from 0.2 to 1 mm and especially preferably in the range from 0.3 to 0.8 mm. For electrical conductors which do not have a circular cross-section, for instance in the case of flat stranded wires or bands, this is to be understood as meaning the smallest thickness.

The electrical conductors may extend longitudinally along the pipe and be embedded in the conductive middle layer such that they are offset from one another by 180° for example. The flow of current from one conductor to the other brings about a warming in the conductive layer. The production of such a pipe is related art.

Helical winding of the electrodes offers improved conduit flexibility and also a greater tolerance to expansion. This procedure advantageously comprises initially producing a single-layer or two-layer pipe composed of the inner layer and optionally a first sublayer of the conductive interlayer, coiling the electrical conductors around said pipe and then applying by extrusion the electrically conductive middle layer or as the case may be the second sublayer of the conductive middle layer thereonto, preferably via a crosshead die or by winding extrusion.

The outer layer may likewise be applied by extrusion for example via a crosshead die or in a multilayer extrusion process. The process may be simplified by applying by extrusion the electrically conductive middle layer, or as the case may be the second sublayer of the electrically conductive moulding compound, and the outer layer together as a two-layer composite. The first and the second electrically conductive sublayer are advantageously made of the same moulding compound. This ensures that good layer adhesion can be achieved. However, it is also possible to employ different moulding compounds provided that said compounds adhere to one another well. Embedding the electrical conductors between two electrically conductive sublayers achieves improved transfer of current.

The electrical conductors are coiled in a pre-tensioned state and said pre-tension is preferably at least 5 N, particularly preferably at least 10 N and especially preferably at least 15 N. The pre-tensioning ensures that the electrical conductors are securely seated.

The electrical conductors are coiled in such a way that the two conductors having opposite polarities are spaced apart from one another in order not to cause a short circuit. Generally, the distance between said conductors is preferably in the range from 2 to 20 mm and particularly preferably in the range from 6 to 16 mm. For perpendicular conductor spacings smaller than half the circumference of the conductive layers the current flows within the electrically conductive layers in a direct path, with axial and radial components, in the vertical direction between the electrical conductors.

Suitable adhesion promoters or adhesives may be utilized to secure the electrical conductors to the pipe. Mechanical securing using threads or bands is also possible.

The moulding compound of the electrically insulating inner layer may be based on the same polymers as the moulding compound of the interlayer. Said compound may, for example, be constructed from polyamides, polyolefins, fluoropolymers, thermoplastic polyesters, polyurethane or mixtures thereof and may comprise the same components such as, for example, impact modifiers, other thermoplasts, plasticizers and other customary added substances. In one preferred embodiment the thermoplastic moulding compound of the inner layer is a moulding compound based on an aliphatic polyamide. In one possible embodiment the outer is the layer I. In a further possible embodiment the inner layer is a layer I. In this case the markedly improved hydrolysis resistance of the moulding compound compared to a corresponding PA12 moulding compound is utilized. Moreover, in a further possible embodiment both the inner layer and the outer layer are a respective layer I.

In a particularly preferred embodiment the electrically conductive thermoplastic moulding compound of the middle layer is a moulding compound based on an aliphatic polyamide, especially preferably PA11 or P12 and both the inner layer and the outer layer are a respective layer I.

In the simplest embodiment scenario the electrically insulating inner layer is single-layered. However, said layer may also be multilayered and may then be composed of a plurality of sublayers, for example an innermost sublayer and an adhesion promoter sublayer. However, embodiments comprising yet more sublayers are also possible, for example comprising an innermost sublayer, an adhesion promoter sublayer, a sublayer which functions as a blocking layer against the medium to be conveyed or components thereof, and an adhesion promoter layer for bonding to the first electrically conductive layer.

The inner layer preferably has a thickness from 0.1 to 1.5 mm, particularly preferably from 0.1 to 1 mm and especially preferably from 0.15 to 0.5 mm. This also includes the embodiment where the inner layer is composed of a plurality of sublayers.

There may also be an additional outer sheathing disposed upon the electrically insulating outer layer, said sheathing being applied via a crosshead die and moulded using a corrugated pipe takeoff for example. A pulled-over pipe may also be shrunk on to become mechanically secured.

In all of these embodiments the outer sheathing may be made either of compact material or of foamed material. For the variant employing foamed material the outer sheathing preferably has a closed-cell structure.

The outer diameter and the wall thickness are in principle not subject to any limitation and depend solely on the application. Nevertheless, for all embodiments of the invention preference is given to outer diameters in the range from 2.5 to 50 mm, preferably from 3 to 30 mm and particularly preferably from 4 to 25 mm while the wall thicknesses are preferably in the range from 0.8 to 4 mm, particularly preferably in the range from 1 to 3 mm and especially preferably in the range from 1 to 2.5 mm. Exemplary embodiments expressed in each case as outer diameter x wall thickness are:

for SCR conduits: 3 mm×1 mm, 4 mm×1 mm, 5 mm×1 mm, 8 mm×1 mm or 12 min×1.5 mm;

for diesel conduits: 6 mm×1 mm, 8 mm×1 mm, 10 mm×1.5 mm or 25 mm×2.5 mm;

conduits for supply of gas to fuel cells in vehicles: 4 mm×1 mm, 5 mm×1 mm, 8 mm×1 mm, 10 mm×1 mm or 12 mm×1.5 mm.

However, in these exemplary embodiments all intermediate ranges are equally possible.

In individual cases the wall thickness and the outer diameter may also be greater for embodiments where the outer sheathing is foamed for thermal insulation. In such cases the wall thickness may well be up to about 15 mm.

When the electrical conductor(s) are to be supplied with current via a coupling said conductor(s) may be detected and bared at the points at which contact needs to be made.

The invention further provides for the use of the inventive heatable conduit pipe for producing an SCR conduit, a conduit for diesel fuel or a conduit for fuel cell systems. To this end the conduit pipe still requires finishing, i.e. completing to provide a fully functional conduit, for example by attaching connecting elements, connectors, clips, holders, cables, plugs or sealing rings or by thermoforming of the conduit to impart the conduit with a flexuous shape dictated by constructional considerations.

The heatable pipe according to the invention exhibits a high heat distortion temperature, very good impact resistance and a high elongation at break. This makes thermal or mechanical damage considerably less likely.

The particular suitability of the moulding compound employed for the layer I in accordance with the invention may be illustrated on an extruded single-layer pipe. Such a single-layer pipe is used to simulate a heatable pipe according to the invention where the outer layer, any middle layer and the inner layer are made of the same moulding compound. Electrically conductive addition in the middle layer moulding compound and the electrical conductor(s) are omitted here.

Having generally described this invention, a further understanding can be obtained by reference to certain specific examples which are provided herein for purposes of illustration only, and are not intended to be limiting unless otherwise specified.

EXAMPLES

The following materials were employed in the example:
PA6T/612: see production example 1
Color batch: mixture of 80 wt. % of PA12 and 20 wt. % of carbon black
TAFMER® MH7010: an anhydride-modified ethylene-butylene rubber from Mitsui Chemicals Calcium stearate: processing aid
Polyad® PB201 iodide: copper-containing stabilizer based on copper iodide and alkali metal halide
Naugard® 445: oxidation stabilizer (aromatic amine)
HI-PA6T/612: the impact modified PA6T/612 moulding compound employed in accordance with the invention Copolyamide Production Example (PA6T/612 50:50):

A polycondensation vessel was initially charged with 12.621 kg of hexamethylenediamine, 9.021 kg of terephthalic acid, 13.356 kg of dodecanedioic acid, 15.000 kg of distilled water and 3.53 g of a 50 weight percent aqueous solution of hypophosphorous acid. The starting materials were melted at 180° C. and stirred for 3 hours at 225° C./22 bar. The mixture was heated to 300° C. with continuous decompression to 10 bar and then further decompressed at this temperature. Once a pressure of 0.5 bar was obtained the vessel was emptied and the product was pelletized. The pellets were subjected to postcondensation in a tumble dryer and thus brought to the desired molecular weight.

Crystallite melting point $T_m$: 278° C. (main peak)

Production of the Moulding Compound (HI-PA6T612) Employed in Accordance with the Invention:

This employed 65.38 parts by wt. of the previously produced PA6T/612, 30 parts by wt. of TAFMER MH7010, 2.5 parts by wt. of color batch, 1.2 parts by wt. of Polyad PB201 iodide, 0.6 parts by wt. of Naugard 445 and 0.32 parts by wt. of calcium stearate. The moulding compound was produced from the individual constituents by melt mixing in a kneading unit and then extruded, pelletized and dried.

Example

An IDE ME 45/4×25 D single-layer pipe extrusion apparatus was used to produce single-layer pipes having an outside diameter of 8.0 mm and a wall thickness of 1.0 mm from the moulding compound employed in accordance with the invention, at 280° C. and 100 rpm.

Tests:

a) Tensile test: The single-layer pipes were tested in accordance with DIN EN ISO 527-1 at a takeoff speed of 100 mm/min. The test specimens had a length of about 200 mm, the clamped length was 100 mm and strain sensor spacing was 50 mm.

b) Impact bending test: Measurement of impact resistance for the single-layer pipes was performed in accordance with DIN 73378 at 23° C. and −40° C. Ten pipe sections of about 100 mm in length were used in each case.

c) Fall hammer test: The fall hammer test was carried out as per SAE specifications. This comprised allowing a specific weight to fall onto the test specimen from a prescribed fall height. This test was used to determine the impact resistance characteristics of the single-layer pipes under the effect of an impact according to SAE J2260 and SAE J844. In each case ten test specimens were measured at −40° C. and, once subjected to the test, visually inspected for damage.

The results are shown in Table 1.

TABLE 1

| Test results | |
|---|---|
| | Example |
| Pipe wall | HI-PA6T/612, 1.0 mm |
| Elastic modulus [MPa] | 1121 |
| Tensile stress at break [MPa] | 44 |
| Elongation at break [%] | 480 |

TABLE 1-continued

| Test results | | |
|---|---|---|
| | | Example |
| Impact resistance | 23° C. | no fracture |
| | −40° C. | no fracture |
| Fall hammer test | SAE J844, −40° C. | no fracture |
| | SAE J2260, −40° C. | no fracture |

The pipe thus exhibits a very high elongation at break and very good mechanical stability.

European patent application No. EP15160082 filed Mar. 20, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A heatable pipe, comprising:
a layer (layer I) of a moulding compound comprising a east 40 wt. % of the following components:
1) 60 to 99 parts by wt. of a partly aromatic copolyamide containing monomer units obtained from
α) 30 to 90 mol % of a combination of hexamethylenediamine and terephthalic acid, and
β) 70 to 10 mol % of a combination of hexamethylenediamine and a linear aliphatic dicarboxylic acid having 8 to 19 carbon atoms;
wherein the mol % values relate to the sum of α) and β) and
wherein not more than 20% of the hexamethylenediamine is optionally replaced by the equivalent amount of another diamine and/or
wherein not more than 20% of the terephthalic acid is optionally replaced by the equivalent amount of another aromatic dicarboxylic acid and/or 1,4-cyclohexanedicarboxylic acid and/or
wherein not more than 20% of the repeating units containing hexamethylenediamine and linear aliphatic dicarboxylic acid are optionally replaced by the equivalent amount of units obtained from a lactam/an ω-aminocarboxylic acid having 6 to 12 carbon atoms,
2) 40 to 1 parts by wt. of an olefinic copolymer as impact modifier,
wherein the parts by wt. of 1) and 2) sum to 100; and
a conductor for electrical current which is embedded between an electrically insulating outer layer and an electrically insulating inner layer.

2. The heatable pipe according to claim 1, wherein the layer I is the inner layer, the conductor for electrical current is a metallic conductor installed directly between the inner layer and the outer layer and the outer layer is a protective cover which is subsequently mechanically applied.

3. The heatable pipe according to claim 1, wherein the layer I is the outer layer, the conductor for electrical current is a metallic conductor installed directly between the inner layer and the outer layer and the outer layer is a protective cover which is subsequently mechanically applied.

4. The heatable pipe according to claim 1, wherein the layer I is the inner layer, the conductor for electrical current is a metallic conductor installed directly between the inner layer and the outer layer and the outer layer is a protective cover which is applied by extrusion.

5. The heatable pipe according to claim 1, wherein the layer I is the outer layer, the conductor for electrical current is a metallic conductor installed directly between the inner layer and the outer layer and the outer layer is a protective cover which is applied by extrusion.

6. The heatable pipe according to claim 1, wherein the crystallite melting point $T_m$ of the copolyamide of layer I is in the range from 220° C. to 300° C. when measured as per ISO 11357 at 2nd heating.

7. The heatable pipe according to claim 1, wherein either the outer layer or the inner layer or both the outer layer and the inner layer are an electrically insulating layer and wherein the conductor for electrical current is a middle layer of an electrically conductive thermoplastic moulding compound in which at least one pair of electrical conductors which are spaced apart from one another is embedded.

8. The heatable pipe according to claim 7, wherein the electrically conductive moulding compound of the middle layer comprises a member selected from the group consisting of conductive carbon black, graphite powder, graphite fibrils and mixtures thereof.

9. The heatable pipe according to claim 8, wherein the electrically conductive moulding compound of the middle layer has a specific resistance in the range from $10^{-3}$ to $10^{10}$ $\Omega m$, wherein measurement is performed as per DIN IEC 60093 in the range from $10^4$ $\Omega m$ and above and as per EN ISO 3915 in the range below $10^4$ $\Omega m$.

10. The heatable pipe according to claim 9, wherein the electrically conductive thermoplastic moulding compound of the middle layer is a moulding compound based on an aliphatic polyamide.

11. The heatable pipe according to claim 8, wherein the electrically conductive thermoplastic moulding compound of the middle layer is a moulding compound based on an aliphatic polyamide.

12. The heatable pipe according to claim 1, wherein the moulding compound of layer comprises 0.01 to 60 wt. % of at least one further additive.

13. The heatable pipe according to claim 12, wherein one of the further additives is a copper-containing stabilizer.

14. An SCR conduit, a conduit for diesel fuel or a conduit for a fuel cell system, comprising:
the heatable pipe according to claim 1.

15. A method of producing an SCR conduit, a conduit for diesel fuel or a conduit for fuel cell systems, said method comprising:
attaching a connecting element, a connector, a clip, a holder, a cable, a plug or a sealing ring to the heatable pipe according to claim 1.

16. A method of producing an SCR conduit, a conduit for diesel fuel or conduit for fuel cell systems, said method comprising:
thermoforming of the heatable pipe according to claim 1 to impart a flexuous shape.

* * * * *